April 6, 1937.　　　E. M. WAYLAND　　　2,076,487
MEANS FOR FRUIT WASHING
Filed Aug. 8, 1933　　　3 Sheets-Sheet 1
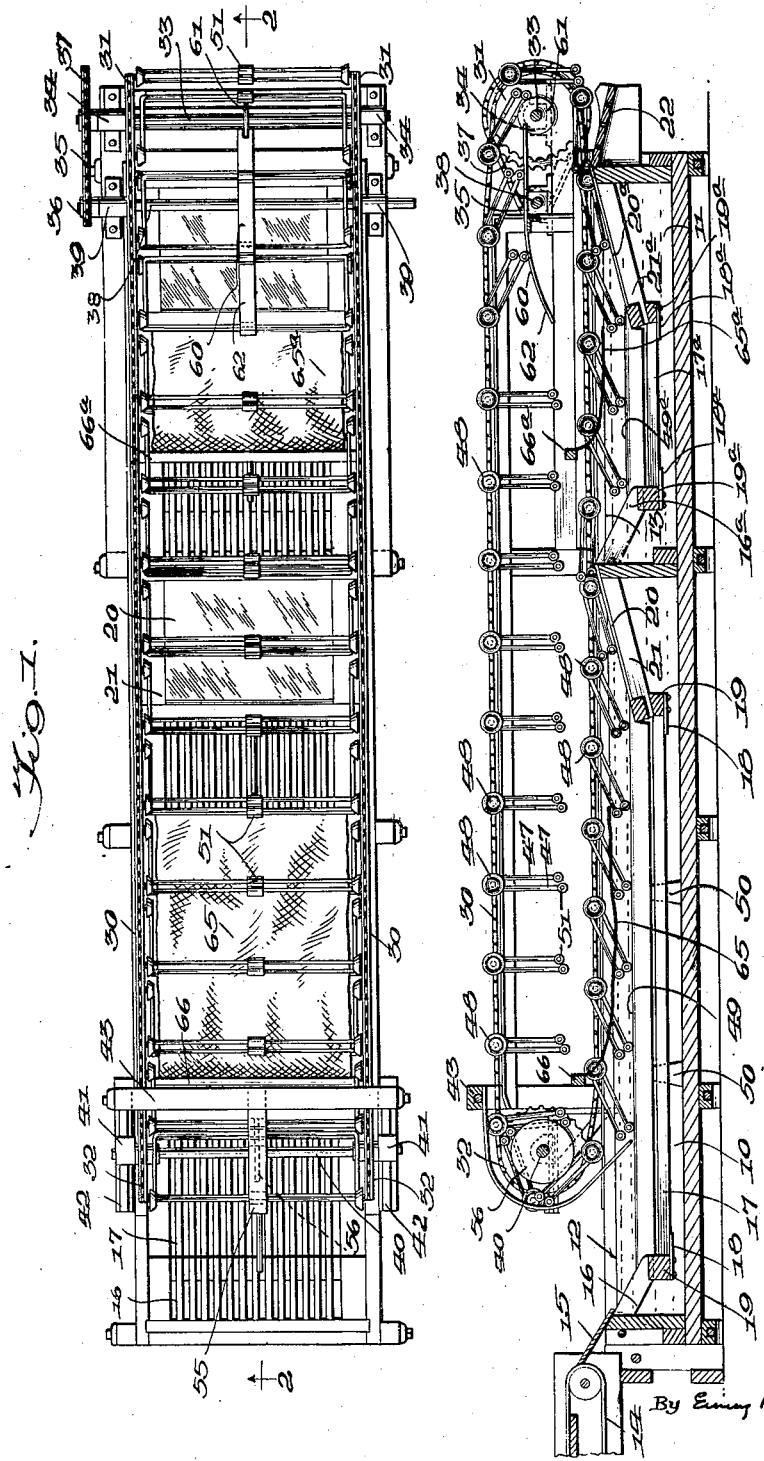
Inventor
Edwin M. Wayland,
By Emery Booth Varney & Holcomb
Attorneys

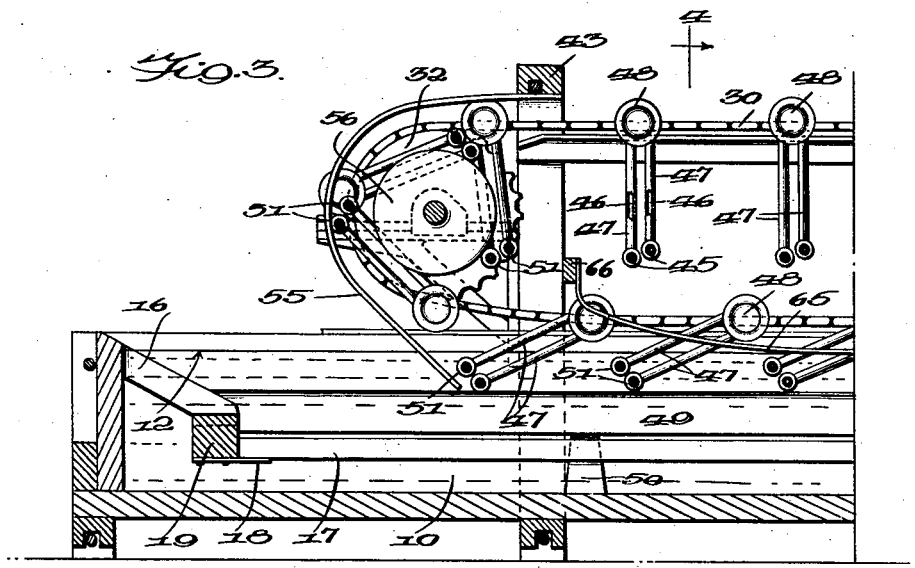
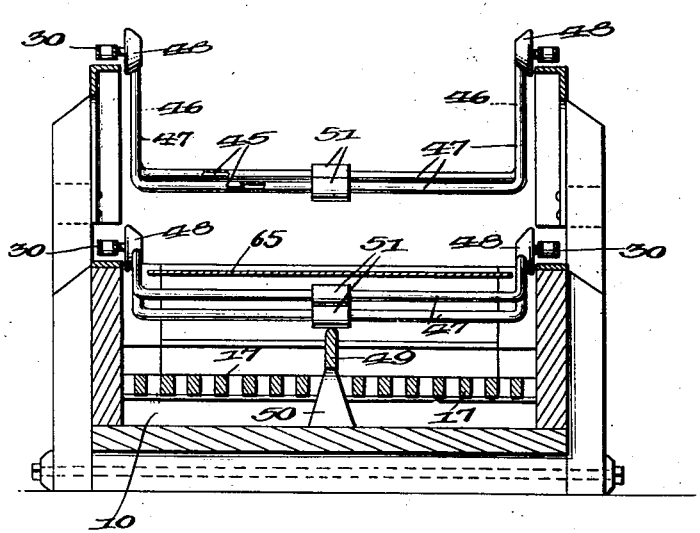

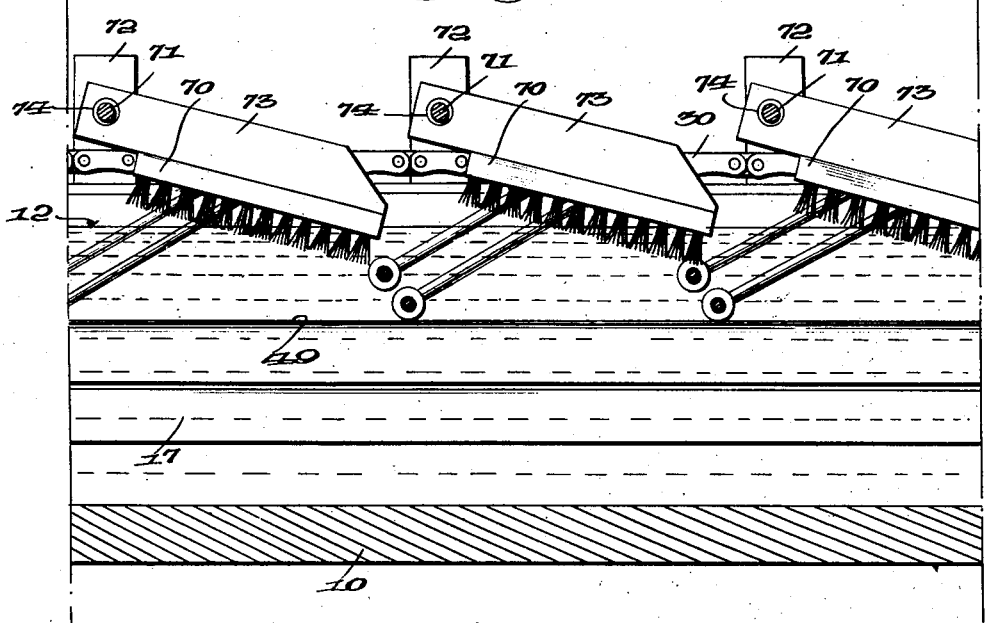
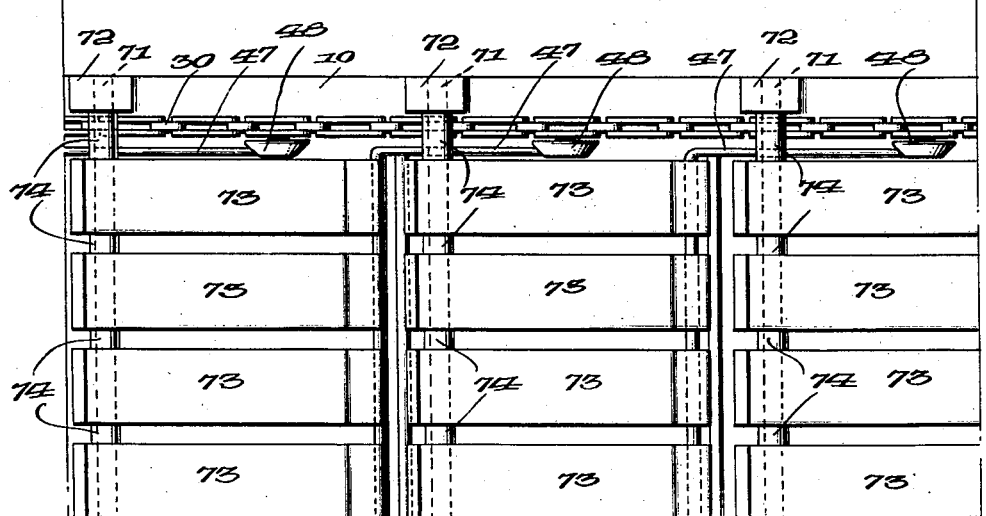

Patented Apr. 6, 1937

2,076,487

UNITED STATES PATENT OFFICE 2,076,487

MEANS FOR FRUIT WASHING

Edwin M. Wayland, Covesville, Va.

Application August 8, 1933, Serial No. 684,240

10 Claims. (Cl. 146—202)

This invention relates to fruit washing methods and equipment and aims generally to provide an improved method of washing fruit and improved apparatus for carrying out the method.

The demand of the market for as nearly perfect fruit as can be produced and the natural desire of the grower to produce as large a crop as possible, have led to the almost universal spraying of growing fruit with insect and vegetable parasite controlling solutions leaving a poisonous residue. Probably the solution most widely used for the spraying of apples and other fruits, generally, is a solution comprising arsenate of lead.

As a result of the spraying of fruit with such poisonous solutions it has become necessary at harvest time to wash the fruit thoroughly to remove the poisonous residues, and the need for this practice has been extended by the requirements of the more important countries that not more than certain maximum "tolerances" for poisonous residues shall be permitted upon imported fruit. While these tolerances are well known to fruit growers generally, to cite an illustrative case, merely by way of example, where the fruit has been sprayed with arsenate of lead there are at present two very small tolerances to be met, that for arsenic residue and that for lead residue, and while these tolerances have been changed repeatedly, for purposes of reference the values .010 and .014 grain of residue per pound of fruit, respectively, may be mentioned as having been required. With other poisons leaving different residues of course different tolerances will be encountered and no limitation on my invention is to be implied from examples given herein.

Up to the present time the standard practice for removal of poisonous residues has been to wash the fruit with dilute hydrochloric acid solution, followed by rinsing with a suitable rinsing solution such as clear water or water containing a little lime, this treatment being generally conducted in one of three ways: by subjecting the fruit to the action of a high velocity spray of acid solution followed by the action of a high velocity spray of rinsing solution; by successively dipping the fruit in relatively deep tanks of acid and rinsing solution; and, with fruit which will float in the solutions, by successively floating the fruit in the solution, while striking the fruit from above by paddles or the like to submerge, overturn, and advance the fruit.

It has been found, however, as set forth in detail in my copending application Serial No. 491,773, filed October 28, 1930, which became Patent No. 2,045,680 on June 30, 1936, that each of these methods has certain disadvantages difficult to overcome; notably, in the case of apples, causing of penetration of acid solution through the calyx tubes, producing a brownish discoloration and drying of the core tissues, frequently followed by core rot resulting from rot spores carried through the calyx tubes by the solutions; so-called "acid-injury" due to overexposure of the fruit to the acid bath or incomplete rinsing of the same, particularly met with in the paddle-type washers, which are of course unable definitely to control the length of acid bath of each piece of fruit; and mechanical bruising of the fruit which is particularly noted in connection with the paddle-type washers. My invention aims to avoid to a maximum extent all these difficulties.

Again, because it has been found, in the case of arsenate of lead, mentioned above by way of example, that while the acid treatment will remove a good part of the lead along with the arsenic, there may be from three to five times as much lead as arsenic left on the fruit after the washing operation, thus obviously varying widely from the relative proportions permissible by the respective tolerances. Government and research agencies, notably in Arkansas and New Jersey, have been trying to develop soapy agents or the like for attacking the residue in the washer in conjunction with the acid, with more or less success, and such an agent has now been recommended for the removal of lead which seems reasonably efficient. However, soapy agents and the like, including the recommended agent mentioned above, cannot be used in washers employing methods involving pumping or other violent agitation, because of their tendency to foam excessively, and of course the high velocity spray type washers are unsuited to handle such agents, while their employment in the dipping tank and paddle-type washers is unsatisfactory, except in special circumstances, because of the tendency of such washers, like the high velocity spray types, to cause core-rot, and because of their tendency to cause acid injury or bruising as above noted.

The method and apparatus of my present invention, by contrast, are adapted to the washing of fruit with soapy and similar "foaming" agents as well as with the acid agents heretofore employed, and eliminate the difficulty of foaming while at the same time avoiding the acid penetration causing core-rot and the irregularity of treatment contributing to acid injury, as will be apparent from the following description, in which the method steps are set forth in connection with the manner in which these steps are carried out by the use of my novel apparatus.

The preferred form of apparatus for practicing the invention, shown in the accompanying drawings, illustrates means for performing all the steps of my novel washing method automatically and in such correlated relation as will avoid the difficulties above set forth, and I prefer to use such automatic equipment to eliminate, as far as possible, manual operations subject to non-uniformity and carelessness which might result in improper residue removal or injury to the fruit, although it is obvious that various modified devices may be used to carry out my preferred method or modifications thereof without departing from my invention.

My novel method, in its entirety, is applicable to the washing of practically any kind of fruit or vegetables, regardless of the specific gravity thereof, and while the relative importance of its several characteristic features varies with the kind of fruit to which it is applied, so far as I have been able to determine, none of its features are disadvantageous with any kind of washable fruit, although various steps of the method may be altered or omitted where conditions do not require a washing method of general application.

*Illustrative embodiment*

In the accompanying drawings forming a part of this specification:

Fig. 1 is a plan view of a preferred form of apparatus according to my invention;

Fig. 2 is a longitudinal sectional view thereof taken at line 2—2 of Fig. 1, looking in the direction of the arrows, also showing the end of a fruit supplying conveyor;

Fig. 3 is a detail view, drawn to a larger scale, in longitudinal section, of the receiving end of the apparatus of Figs. 1 and 2;

Fig. 4 is a transverse sectional view thereof taken at line 4—4 of Fig. 3, looking in the direction of the arrows;

Fig. 5 is a detail view, in longitudinal section, of a partial modification of my invention; and Fig. 6 is a partial plan view of the modification shown in Fig. 5.

*General set-up*

Referring to the drawings, the illustrative apparatus disclosed in Figs. 1 to 4 comprises a tank 10 for containing washing solution and a tank 11 for containing rinsing liquid, constituting a plurality of successive washing and rinsing tanks.

Each of the successive tanks 10, 11 is filled to a suitable depth, indicated generally at 12 and 13, with the bath intended to be contained therein. Merely by way of example, the tank 10 may be filled to the depth 12 with a washing solution, such as a dilute hydrochloric acid bath, possibly with one of the "foaming" agents now recommended, or any other suitable washing agent, of proper strength for the cleaning to be effected and the tank 11 will customarily be filled to the depth 13 with clear water or water with a little lime or other neutralizing agent added thereto.

Any suitable manual or mechanical means may be employed to conduct fruit to be washed to the receiving end of the first tank 10, and I have indicated at 14 and 15, respectively (see Fig. 2, omitted in Fig. 1) an ordinary dump belt or canvas belt conveyor, and an ordinary rubber lined chute leading from the same into the receiving end of the tank 10, as illustrative of such means.

The fruit conducted to the receiving end of the first tank passes into the same over inclined slats 16 which prevent the fruit from piling up at the receiving end of the tank, and then pass forwardly in the surface strata of the liquid.

To prevent undue submergence of fruit tending to sink in the solution in the tank 10, and to hold up the fruit acted upon by the wet rubbing means as hereinafter described, a false bottom 17 is provided for the tank, mounted in any suitable way, as by means of supports 18 carried by cross members 19, in such position as to avoid such submersion of the fruit being washed as might cause entry of liquid through open calyx tubes by hydrostatic pressure. The permissible depth of submersion will, of course, depend more or less on the character of the fruit being washed, and the extent of cooperation desired between the false bottoms and the wet rubbing means, but with normal sized pears, for example, I have found it satisfactory to position the false bottom about four inches below the surface of the liquid.

In the preferred embodiment illustrated, it will be seen that the false bottom 17 is of slatted construction, and that the cross member 19 at the receiving end of the tank is also employed for mounting the inclined slatted ramp 16. In order to facilitate cleaning up the tank, and because the false bottom 17 may be omitted when its cooperation is not desired by the operator, as in washing light weight fruit certain to float at the surface, the false bottom 17 is made removable in the preferred embodiment, and the slatted ramp 16 may also be removable as shown.

*Fruit transfer and discharge means*

After the fruit has been caused to move progressively through the tank by any suitable means, of which a preferred embodiment is hereinafter described, it is transferred to the rinsing tank, and for this purpose means is provided for effecting removal of the fruit from the discharge end of the tank 10. While many types of such means have been heretofore employed, most of them have been found unsatisfactory, either because too complicated or expensive, or because of the tendency of the fruit to roll back from the removing means into the tank, causing non-uniform exposure to the acid or other solution, or because of the tendency thereof to bruise or cause abrasion of the skins of the fruit.

Thus while such known means may be employed in practicing my invention in its broader aspects, I prefer to employ the novel fruit removing means disclosed, which is extremely cheap and simple, not badly affected by the solutions used, and fully avoids rolling back of the fruit or abrasion thereof. This novel means of my invention consists in a ramp of material having a very low coefficient of friction with wet fruit, and over which the fruit may be moved with a sliding action as opposed to any material rolling action, without abrasion of the skins and without bumping or jamming apt to cause bruises to develop. I have determined that hard rubber, glass, and similar materials are particularly suited in this regard because immune to attack from the acids employed in washing fruit, and because of their extremely low coefficients of friction with wet fruit, which may be illustrated by rubbing a wet apple over a clean window pane, and that glass is a particularly desirable one of these materials for several reasons. Wherefore, in my preferred embodiment, I employ as the discharge ramp of my washing tank a glass plate 20 suitably supported, as by frame 21, and over which the fruit may be slid for delivery to the rinsing tank, by any suitable means, but preferably by the fruit moving means hereinafter described.

The rinsing tank 11 may be, as in the form shown, of the same construction as the washing tank 10, and may comprise the slatted ramp 16ª, similar to ramp 16, for receiving the fruit from the washing tank, the removable slatted bottom 17ª carried on supports 18ª secured to cross-members 19ª, and a glass plate or equivalent delivery ramp 20ª similar to the ramp 20, which may be suitably supported in a frame 21ª and may discharge to any suitable off-take means, generally indicated as a slatted ramp 22.

*Fruit advancing means*

As above noted, my invention contemplates the provision of means for advancing the fruit through the tanks positively, to avoid unequal exposure and consequent "acid injury" thereby, and when employing foam-forming washing agents, so quietly as to avoid the formation of foam. By my pointing out of the utility of such provisions and a preferred mode of embodying the same, various modifications will of course suggest themselves to those skilled in the art, by which to practice my invention, so that my invention in its broader aspects is not limited to any particular form of fruit-conveying means; but my invention also includes the particularly advantageous form of fruit-moving means disclosed, and the several novel features thereof which severally and jointly contribute greatly to the effectiveness, simplicity, low first cost and low upkeep cost of my washer, facilitate maintenance and repair thereof, provide a minimized overall height, and contribute to ease, quietness and cheapness of operation.

In the preferred embodiment illustrated in the drawings this means consists of conveying apparatus including dredging means, adapted positively to dredge the fruit, in small batches, through and out of the apparatus, and preferably so constructed that only the readily protectable and replaceable dredging elements are exposed to the action of the washing fluids, while the remainder of the fruit moving apparatus is maintained out of contact with the liquids used.

Referring to the drawings, it will be seen that this apparatus comprises conveyor side chains 30 arranged longitudinally of the tanks 10 and 11 at the sides thereof and out of contact with the solutions in the tanks, and that these side chains 30 have pivoted thereto depending dredging elements 45—48 adapted to be dragged through the tanks 10 and 11, just below the surface of the liquid therein, and up over the plate glass ramps 20 and 20ª to move the fruit positively through the apparatus in the surface strata of liquid therein.

The side chains 30 in the preferred embodiment are caused to move together in the simplest possible way by mounting them on driving and idle sprockets 31, 32, of which the driving sprockets 31 are carried on a transverse shaft 33, suitably journaled at 34 as shown. Drive of the shaft 33 may be effected in any suitable way, as by means of a chain 35 and sprockets 36, 37, the driven sprocket 37 being carried on the shaft 33 and the driving sprocket on a parallel shaft 38, suitably journaled at 39 and arranged within the longitudinal confines of the machine. The arrangement indicated is particularly advantageous as it enables speed reduction to be effected at the point of use and disposes the speed reducing drive 35, 36, 37 and shaft 38 conveniently, and in space that would otherwise not be usefully employed.

The idler sprockets 32 may be mounted in any suitable way but are preferably also mounted on a transverse shaft, indicated at 40, because such shaft provides a convenient mode of mounting the same and also cooperates in the provision of a novel "overturning means" for the depending dredging elements as hereinafter set forth. To provide for tightening the conveyor side chains 30, the idler shaft 40 is preferably mounted in journals 41 adjustable longitudinally on clamp brackets 42 suitably mounted on the conveyor supporting framework 43.

The pivotally mounted depending dredging members, best shown in Figs. 3 and 5, may be of various forms and while in its broader aspects my invention is not limited to any one form thereof, I prefer to employ forms comprising transverse members of any suitable construction (see Fig. 4) mounted like the base of a U pivoted at its ends. In the form shown, which is particularly desirable, the transverse members illustrated consist of two rods 45 (see Fig. 4), and the side members 46 of the U-shaped depending dredging members, as best shown in Fig. 3, are formed as continuations of the rods 45 extending upwardly like the legs of a U.

All those portions of the dredging members 45—48 exposed to the action of the solutions used for fruit washing are preferably either of corrosion-resisting metal or, if made of less expensive material, protected by acid proof paint or in some other suitable way against injury by the solutions. In the present disclosure this is effected by covering each of the cross-flight rods with a rubber sleeve 47 (which also cushions contact with the fruit) to a point well above the area of exposure to the liquids, and herein to a point within the confines of the pivoted securing members 48 which clamp the two rods of the double rod cross-flights in proper mutual relation, and are pivoted to the side chains 30 in any suitable way to effect swinging suspension of the cross-flights.

As clearly shown in the drawings, the transverse members or cross-flights of the dredging members 45—48 are preferably arranged to depend at least slightly during their return movement with the upper run of the side chains 30, and to trail behind their pivoted members 48 during their active travel through the solutions, being supported to travel just under the liquid surfaces by any suitable means such as one or more of the riding tracks 49, 49ª, shown as carried on the tank cross-members 19, 19ª, respectively, and further supported, in the case of the longer track 49, by intermediate pedestals 50.

As best shown in Fig. 2, after reaching the lower ends of the discharge ramps 20, 20ª, the transverse cross-flights 45—47 travel up the same, sliding the fruit in advance thereof up over the ramps to discharge it from the respective tanks 10, 11. When employing the double rod construction of cross-flights of my preferred embodiment, I have found it particularly desirable to make the upper of the bail members 45—47 (in trailing position) of greater length than the lower one, as shown, thus causing the cross-flights to define a plane rearwardly inclined from the normal to the ramp surface, to avoid any possibility of large sized fruit contacting the under side of the upper bail rod and lifting the rods, which might allow small sized fruit to pass under the lower rod and return to the tank with consequent excess exposure to the solution therein.

In forms similar to that shown, in which the cross-flights are formed of a pair of rubber covered rods and slide on the track members 49, 49ª, and on the inclined ramps 20, etc., in order to avoid wear of the rubber coverings of the cross-flight, wear members 51 (best shown in Fig. 4) are provided, and with the glass ramps 20, 20ª it is preferable that these be formed of rubber, because of the low coefficient of friction between wet rubber and glass. In the illustrative embodiment these wear members 51 are formed of short sections of heavy rubber tubing slipped over the rubber sheathed cross-rods 45—47 with a sufficiently close fit to remain in place, and these wear members are positioned to cover all wear points, both during the active and return runs of the conveyors as hereinafter more fully explained.

*Dredger depositing means*

In order to deposit the dredging members 45—48 smoothly and gradually in the tank 10 in the inclined position to be taken thereby in travel therethrough, I have provided in my preferred embodiment an illustrative means for guiding and depositing the dredger elements at the commencement of their active stroke.

Referring to Figs. 1 through 3, this depositing means comprises a guide member 55 down which the dredgers are slid into the solution, and means for presenting the dredgers to the guide member in position to slide down the same. In the illustrative embodiment the guide member is in the form of a narrow plate supported in any suitable way, and the dredger presenting means takes the form of a means for turning the dredgers to present them to the guiding means in position to slide down the same into the tank 2. In the form shown, the dredger turning means comprises a disc 56, mounted on the idler shaft 40 intermediate the idler sprockets 32, and rotatable therewith, to engage a wear element 51 on the transverse dredging rod 45—47, and turn the dredging element over the shaft 40 and present it in overturned relation to the slide 55 to slide down the same and be deposited smoothly in active position, without head-on abutment against any member, which might cause damage of the same, and without foam-producing splash, or any chance of bruising the fruit. The slide 55, in the form shown, is supported by the apparatus frame members 43, and arched outwardly to provide clearance for the overturning movement. Even in effecting overturn of the dredging members in this way there is practically no likelihood of causing liquid to run onto and damage the side chains 30, because the dredging elements which have passed through the rinsing tank 11, before starting their return run, have had at least a slightly depending position throughout the major portion of their return run with the result that they are substantially entirely drained by the time they reach the dredger turning and depositing means of the apparatus.

*Dredger lifting means*

With the construction disclosed, and any similar constructions employing transverse elements such as the shafts 33 and 38 between the conveyor runs, my invention contemplates that means may be provided for lifting the dredging members over such obstructions, and illustrative means for this purpose, which maintain the downward inclination of the dredger elements during the lifting thereof, are shown associated with the shafts 33 and 38 in Figs. 1 and 2, wherein a track element 60 suitably supported on the machine frame, is arranged to be engaged by a wear element 51 on the dredgers 45—48 to carry the same over the obstruction 38 with all wear localized on the wear elements 51, and wherein a disc 61 is arranged to engage a wear element 51 to lift the dredgers over the shaft 33 without contact therewith (and incidentally to deposit them on the track 60 to avoid necessity of raising them again as the shaft 38 is reached) both of which means are preferably arranged to avoid raising the dredgers above the horizontal, thus to avoid drainage of liquid therefrom onto the side chains 30 and adjacent parts. Whatever single or combined lifting means is used, unless the machine is arranged to retain the dredgers in raised position until they reach the overturning means (as by extension of the track 60 thereto) it is preferable to construct the same to drop the dredgers 45—48 to vertical quite gradually after the obstruction is passed, to avoid swinging of the same, and to illustrate this the trackway 60 is shown gradually lowered at 62.

*Wet rubbing means*

As above mentioned, to effect thorough washing of the fruit notwithstanding the lack of turbulence of the washing and rinsing baths and the quiet movement of the fruit therethrough, my invention contemplates wet-rubbing the fruit by suitable means which, in the form shown in Figs. 1 through 4, comprises long trailing cloths 65, 65ª, of canvas or the like, supported above the solutions in the tanks, as by frame members 66, 66ª, and trailing out along a substantial part of the liquid surfaces in the tanks, to press down upon the fruit conveyed thereunder by the dredging means, thus insuring shallow submersion of the same and preventing any fruit from jumping over the dredging members, and effecting rotation of the fruit and wet-rubbing of the surface thereof to assure effective removal of the residues thereon. The elongation of the trailing cloths 65, 65ª insures a continuous action on the fruit, rather than a mere intermittent bobbing thereof, and assures sufficient weight thereof to maintain maximum effectiveness, particularly when the wet rubbing means is employed in conjunction with the false bottoms 17, 17ª positioned to prevent the fruit from submerging too deeply, and to hold it up in contact with the wet rubbing means to be turned and slightly scoured thereby.

*Modified wet rubbing means*

As illustrative of another form of wet rubbing means to indicate that my invention in its broader aspects is not limited to any particular form thereof, I have shown in Figs. 5 and 6 an arrangement consisting of a multiplicity of brushing elements 70, arranged in transverse rows individually pivoted to transverse rods 71, supported on the tank as by members 72, and adapted to act upon the fruit with a wet rubbing, rotating and shallow submerging effect, as the latter is moved beneath them by the dredging elements 45—47.

The pivotal mounting of the brushes 70 in the form shown is effected by means of wooden blocks 73, angle irons, or other suitable elements secured to the backs of the brushes and pivoted on the rods 71, the spacing of the brushes 70 being maintained by pipe spacers 74, as shown. With this arrangement the several brushes are free to move up and down independently like the fingers of many hands, for effectively accommodating various sizes and shapes of fruit and the shallow bobbing thereof as it passes under the same. This arrangement is particularly effective when employed in conjunction with the false bottoms 17, 17a which act as barriers preventing the fruit from bobbing away from the brushes, and thus increase the turning and slight scouring effect thereof.

Conclusion

From the foregoing detailed description it will be apparent that my invention provides a new and effective method of washing fruit, adapted for solutions tending to foam, in which turbulence and violent movement of the fruit is avoided without sacrifice of efficiency in cleaning; in which danger of penetration of solution through the calyx tubes is minimized by avoiding deep submersion and violent agitation or spraying; and in which danger of unequal exposure and consequent acid injury is minimized by avoidance of turbulent conditions and other factors tending to interfere with uniform control of the method of washing.

It also will be apparent from the illustrative embodiments disclosed, that in developing an apparatus for carrying out my method, I have provided numerous novel structural elements and combinations thereof, contributing to the simplicity, economy and effectiveness of my invention and aiding in substantially avoiding any chance of injury to the fruit. For example, my conveyor structure as disclosed is of minimum overall height because it maintains its dredging members no higher than the upper chain runs 30 at all times. Moreover, its simplicity renders it substantially fool-proof. In addition, its novel design is such that all exposed metal parts are maintained well away from the liquid in the tanks, where they are readily accessible for inspection or repairs, and where they may be kept coated with grease as well as acid-proof paint to prevent deterioration.

In operation, by my invention, the fruit is moved at a controlled rate of speed, avoiding any likelihood of fruit becoming stranded in eddies, with resultant over-exposure to the acid, and avoiding any chance of other fruit being hurried through the washer with insufficient exposure. Moreover, the very slow and gentle motions of the machine of my invention avoids all likelihood of bruising of even the tenderest fruit, and while producing a gentle and thorough motivity of the solutions, avoids any violent agitation thereof such as would make it impractical to use soapy agents for removal of lead, for example, on account of foaming.

While I have described herein preferred embodiments of my new washing method and apparatus for the purpose of clearly illustrating and explaining the same, it is, of course, appreciated that my invention is not limited to the specific details set forth for illustrative purposes, but includes such methods and equipment as are equivalent to those disclosed herein or may be suggested to those skilled in the art by my present disclosure, and that my disclosure and claims are to be construed accordingly.

I claim:

1. In a fruit washing apparatus, a tank for containing a washing liquid, a submerged supporting surface dividing said tank into a surface strata washing compartment and a settling chamber, a continuous conveyor overlying said tank and above the liquid therein, said conveyor comprising depending transverse dredging members pivotally mounted to hang into the washing compartment to engage only the rear face of the fruit to propel it therethrough and to continue to hang in a generally downward direction during transfer to, and at least a part of, their return run to provide for drainage of said dredging members away from their pivotal mountings.

2. In a fruit washing apparatus, a liquid tank, a submerged stationary false bottom for limiting the depths to which the fruit may be submerged therein, a continuous conveyor arranged thereover, said conveyor comprising depending, pivoted, fruit-moving push bars hanging therefrom to drag through the washing liquid when moving along the lower flight of the conveyor to push the fruit through the tank, said bars being arranged to hang in a generally downward direction from the upper flight thereof during their return, said arrangement avoiding spreading of washing liquid from said fruit-moving members to the rest of the conveyor structure.

3. In a fruit washing apparatus, a liquid tank, a submerged stationary false bottom for limiting the depths to which the fruit may be submerged therein, conveyor side chains arranged longitudinally at the sides thereof and out of contact with the liquid therein, and generally U-shaped fruit dredging push bars pivoted to said side chains and depending therefrom to drag through the washing liquid to advance the fruit therethrough, said pivotal arrangement of said U-shaped members enabling them to hang so as to drain away from their pivoted ends during return movement of the conveyor side chains and thus avoiding spreading of washing liquids to the side chains therefrom.

4. In a fruit washing apparatus, a tank, a smooth plate arranged at an incline in the delivery end of said tank, and a pair of transverse rods arranged one above the other and adapted to move upwardly along said plate to convey the fruit up the inclined plate and deliver it from the tank, said pair of rods being mounted like the base of a U pivoted at its ends, and said rods being arranged with their transverse portions defining a plane inclined rearwardly from the normal to said plate, thereby avoiding tripping up of said rods and rendering positive their delivery of fruit.

5. A fruit washing machine including a ramp for conducting wet fruit and a fruit conveyor member slidable over said ramp, said fruit conveyor member being rubber surfaced at a point of contact with said ramp, and said ramp having a surface of a material, glass for example, having a very low coefficient of friction with wet rubber, thereby minimizing wear between the parts.

6. In a fruit washing machine, a liquid tank, a submerged supporting surface dividing said tank into a surface strata washing compartment and a settling chamber, continuous conveyor side chains arranged longitudinally at the sides thereof and entirely out of contact with the liquid therein, and fruit moving members pivotally depending between said conveyor side chains to move through the liquid in the washing compartment to engage only the rear face of the fruit and propel it through the machine, and arrangements for insuring a downward disposition of said fruit-moving members during transfer thereof from the fruit advancing run to the return run of said conveyor chains and throughout a substantial length of the return run thereof, thereby providing for drainage of said members and substantially avoiding spreading of liquid from the same to the conveyor side chains.

7. In a washer for washing fruit, in combination a tank to contain a body of a washing solution of greater depth than the diameter of the fruit to be washed, means for feeding fruit to one end of the tank, a stationary submerged supporting member extending substantially the length thereof dividing said tank into a surface strata in which the fruit is confined and a settling chamber practically devoid of turbulence, means mounted above the tank and operable only in the surface strata of the solution body and engaging the rear face only of the fruit to move the fruit forwardly through the surface strata of the tank and in rolling contact with the stationary supporting member, and to substantially avoid turbulence in the settling chamber, and means overlying said solution body closely adjacent the surface thereof to press down upon and lightly wet-rub the fruit to effect thorough washing thereof.

8. In a washer for washing fruit, in combination a tank to contain a body of a washing solution of greater depth than the diameter of the fruit to be washed, means for feeding fruit to one end of the tank, a stationary submerged slatted supporting member extending substantially the length thereof dividing said tank into a surface strata in which the fruit is confined and a settling chamber practically devoid of turbulence, means mounted above the tank and operable only in the surface strata of the solution body and engaging the rear face only of the fruit to move the fruit forwardly through the surface strata of the tank, and means overlying said solution body closely adjacent the surface thereof to engage the fruit and press it down upon the submerged supporting member, thus to coact with the fruit moving means to roll the fruit along the supporting member and lightly wet-rub the fruit to effect a thorough washing thereof.

9. In a washer for washing fruit, in combination a tank to contain a body of a washing solution of greater depth than the diameter of the fruit to be washed, means for feeding fruit to one end of the tank, a stationary submerged supporting member extending substantially the length thereof dividing said tank into a surface strata in which the fruit is confined and a settling chamber practically devoid of turbulence, a fruit conveyor comprising side chains mounted above the tank, a plurality of fruit moving members pivotally depending from said side chains adapted to engage the rear surface only of the fruit and propel it forwardly through the tank in rolling contact with the supporting surface, guide means for said fruit moving members to retard rapid down-swinging movement of said members as they enter the washing solution to avoid injury to the fruit, and means overlying said solution body closely adjacent to the surface thereof t opress down and lightly wet-rub the fruit to effect a thorough washing thereof.

10. In a washer for washing fruit, in combination a tank to contain a body of a washing solution of greater depth than the diameter of the fruit to be washed, means for feeding fruit to one end of the tank, a stationary submerged supporting member extending substantially the length thereof dividing said tank into a surface strata in which the fruit is confined and a settling chamber practically devoid of turbulence, means mounted above the tank and operable only in the surface strata of the solution body and engaging the rear face only of the fruit to move the fruit forwardly through the surface strata of the tank and in rolling contact with the stationary supporting member, and to substantially avoid turbulence in the settling chamber, and a plurality of brush means pivotally mounted on supports above and closely adjacent the surface of the solution and adapted to press down upon and lightly wet-rub the fruit to effect thorough washing thereof.

EDWIN M. WAYLAND.